3,167,536
PROCESS FOR THE REMOVAL OF ATACTIC FRACTIONS FROM POLYPROPYLENE
Ljuba Žampachová and František Žampach, both of 38 Alesova, Brno, Czechoslovakia
No Drawing. Filed Oct. 6, 1961, Ser. No. 143,306
Claims priority, application Czechoslovakia, Oct. 12, 1960, 6,126/60
7 Claims. (Cl. 260—93.7)

This invention relates to a process for the removal of atactic fractions from polypropylene produced by polymerization carried out in propane or propene medium or in any mixture of both.

After polymerization polypropylene has to be freed from low-molecular weight atactic fractions which impair the properties of the polymer and whose presence is undesirable in further processing. These atactic fractions are usually removed from the polymerization product by extraction with higher hydrocarbons (petrol, hexane, heptane, etc.). This procedure requires an expensive drying process to make the polymer free from traces of solvents and moreover makes it impossible to recover the higher-boiling hydrocarbon or to regulate the content of atactic fractions in the polymer.

The removal of atactic fractions by extraction with lower hydrocarbons (e.g., propane, propene or their mixture) is little effective at room temperature. Extraction at elevated temperatures with these same hydrocarbon solvents, which according to current concepts ought to be more successful, give on the contrary still worse results so much so that in these conditions no atactic fractions are extracted from polymers having a higher molecular weight.

The object of the present invention is on the one hand the utilization of the surprising effect that at lowered temperatures the extraction by means of propane, propene or their mixtures yields the same efficient separation of atactic fractions as is achieved by an extraction with higher-boiling hydrocarbons and on the other hand the utilization of the fact that the addition of certain amounts of higher-boiling hydrocarbons increases the extraction ability of said lower hydrocarbons at room temperature.

The process of the present invention is technologically simpler and economically more advantageous than the extraction by higher hydrocarbons mentioned above and moreover makes it possible, by a suitable choice of the temperature of extraction, to regulate the amount of atactic fractions left in the polymer, which circumstance is of importance for the production of polymers for various purposes. Reduced working pressure corresponding to lowered temperature of extraction is also advantageous from the viewpoint of lower investment in extraction equipment.

Efficient extraction by propane (or propene or their mixtures) is achieved by lowering the temperature of extraction to temperatures within the range +10 to −25° C. The chosen temperature depends on the molecular weight of the polymer, on the original and the desired final amount of atactic fractions, on the solvent-to-polymer ratio during extraction, on the number of extractions, etc. Conditions of extraction and results achieved are apparent from examples.

As already stated above, the efficiency of an extraction made at room temperature can be increased by additions of higher-boiling hydrocarbons in amounts within the range of 5 to 40%, preferably 20–40%, the amount depending on the molecular weight of the polymer, on the original and the desired final amounts of atactic fractions, on the solvent-to-polymer ratio during extraction and on the number of extractions.

*Examples*

(1) Polypropylene having an intrinsic viscosity of 3.70 dl./g. (as measured in tetraline solution at 140° C.) and an original content of atactic fractions of 17.0% (as determined by cold n-heptane extraction) was extracted once with six times its weight of propane in a pressurized extractor. Results obtained are summarized in the following table:

| Temperature: | Resulting content of atactic fractions, percent |
|---|---|
| 50° C. | 17.0 |
| 25° C. | 13.0 |
| 10° C. | 9.2 |
| 0° C. | 7.3 |
| −25° C. | 4.9 |

(2) Polypropylene having an intrinsic viscosity of 2.20 dl./g. and an original content of atactic fractions of 15.4% was extracted once by six times its weight of propane in a pressurized extractor (the filtration cake) containing 100 weight percent (based on dry polymer of propane). Following results were obtained:

| Temperature: | Resulting content of atactic fractions, percent |
|---|---|
| 50° C. | 13.6 |
| 30° C. | 9.9 |
| 20° C. | 8.0 |
| 10° C. | 6.2 |
| 5° C. | 5.6 |
| −10° C. | 4.5 |

As is seen from Examples 1 and 2, the higher the molecular weight of the polymer, the lower temperature of extraction which is necessary for the purpose; the amount of atactic fractions left in the polymer also decreases with decreasing temperature.

(3) Polypropylene having an intrinsic viscosity of 3.60 dl./g. and an original content of atactic fractions of 14.4% was extracted at −10° C. once by six times its weight of propane-propene mixtures with gradually changing content of propene in the mixture. Following results were obtained:

| Weight percent of propene in the propane-propene mixture: | Resulting content of atactic fractions, percent |
|---|---|
| 0 | 4.2 |
| 20 | 4.2 |
| 40 | 3.8 |
| 60 | 3.7 |
| 80 | 3.6 |
| 100 | 4.2 |

It is seen that both hydrocarbons and also their mixtures display the same extraction effects.

(4) Polypropylene having an intrinsic viscosity of 3.71 dl./g. and a content of atactic fractions of 17.0% was extracted at 25° C. once by six times its weight of propane-hexane mixtures of gradually increasing content of hexane, with following results:

| Content of hexane (by volume): | Resulting contents of atactic fractions, percent |
|---|---|
| 0 | 13.0 |
| 5 | 9.6 |
| 10 | 6.3 |
| 20 | 5.2 |
| 40 | 4.7 |
| 80 | 4.4 |
| 100 | 4.4 |

It is evident from these results that the extraction efficiency of the mixture no longer increases beyond concentrations of hexane in the mixture exceeding 40%.

We claim as our invention:

1. A process for the removal of atactic fractions from polypropylene produced by polymerization in a medium consisting of at least one substance selected from the group consisting of propane and propene, comprising the steps of subjecting said polymer at a temperature of between $+10°$ C. and $-25°$ C. to extraction with a solvent for said atactic fractions, said solvent consisting of at least one member of the group consisting of propane and propene.

2. A process for the removal of atactic fractions from polypropylene produced by polymerization in a medium consisting of at least one substance selected from the group consisting of propane and propene, comprising the steps of subjecting said polymer at a temperature of between $+10°$ C. and $-25°$ C. to extraction with propane as a solvent for said atactic fractions.

3. A process for the removal of atactic fractions from polypropylene produced by polymerization in a medium consisting of at least one substance selected from the group consisting of propane and propene, comprising the steps of subjecting said polymer at a temperature of between $+10°$ C. and $-25°$ C. to extraction with propene as a solvent for said atactic fractions.

4. A process for the removal of atactic fractions from polypropylene produced by polymerization in a medium consisting of at least one substance selected from the group consisting of propane and propene, comprising the steps of subjecting said polymer at room temperature to extraction with a solvent for said atactic fractions, said solvent consisting of a mixture of between 90 and 60% of at least one member of the group consisting of propane and propene, and between 10 and 40% of higher-boiling hydrocarbons.

5. A process for the removal of atactic fractions from polypropylene produced by polymerization in a medium consisting of at least one substance selected from the group consisting of propane and propene, comprising the steps of subjecting said polymer at room temperature to extraction with a solvent for said atactic fractions, said solvent consisting of a mixture of between 90 and 60% of at least one member of the group consisting of propane and propene, and between 10 and 40% of hexane.

6. A process for the removal of atactic fractions from polypropylene produced by polymerization in a medium consisting of at least one substance selected from the group consisting of propane and propene, comprising the steps of subjecting said polymer at room temperature to extraction with a solvent for said atactic fractions, said solvent consisting of a mixture of between 90 and 60% of at least one member of the group consisting of propane and propene, and up to 40% of higher-boiling hydrocarbons.

7. A process for the removal of atactic fractions from polypropylene produced by polymerization in a medium consisting of at least one substance selected from the group consisting of propane and propene, comprising the steps of subjecting said polymer at a temperature below $+10°$ C. to extraction with a solvent for said atactic fractions, said solvent consisting of at least one member of the group consisting of propane and propene.

References Cited by the Examiner

UNITED STATES PATENTS

| | | | |
|---|---|---|---|
| 2,945,015 | 7/60 | Detter | 260—88.2 |
| 3,066,124 | 11/62 | Telfer | 260—93.7 |

JOSEPH L. SCHOFER, *Primary Examiner.*